United States Patent

[11] 3,545,711

| [72] | Inventor | Henry F. Scheneman<br>8358 Alpine Ave. NW, Sparta, Michigan 49345 |
|---|---|---|
| [21] | Appl. No. | 802,073 |
| [22] | Filed | Feb. 25, 1969 |
| [45] | Patented | Dec. 8, 1970 |

[54] SUPPORT BRACKET FOR ENGAGEMENT WITH PERFORATE PANELS
4 Claims, 4 Drawing Figs.

[52] U.S. Cl. .................................................... 248/223, 24/201
[51] Int. Cl. ..................................................... A47f 5/00
[50] Field of Search ............................................ 248/73, 223, 224, 225, (Pegboard Digest)216, 217, 218, 220.5; 24/243(LP), 201.1, 201(CTD)

[56] References Cited
UNITED STATES PATENTS

| 2,658,705 | 11/1953 | Whitman | 248/223X |
| 2,961,724 | 11/1960 | Alling | 24/73 |
| 3,272,468 | 9/1966 | Wittrock | 248/225 |
| 3,409,260 | 11/1968 | Bleed | 248/216 |
| 3,422,508 | 1/1969 | Higuchi | 24/201(UX) |

*Primary Examiner*— Roy D. Frazier
*Assistant Examiner*—J. Franklin Foss
*Attorney*—Glenn B. Morse ABSTRACT: A support arm is engageable with separable members provided with offset tabs adapted to enter spaced holes in a perforate panel of the type commonly referred to as "peg board". These members, when fully engaged with the peg board and by the support arm, generate a solid clamping action on the opposite faces of the panel, and prevent accidental displacement of the arm.

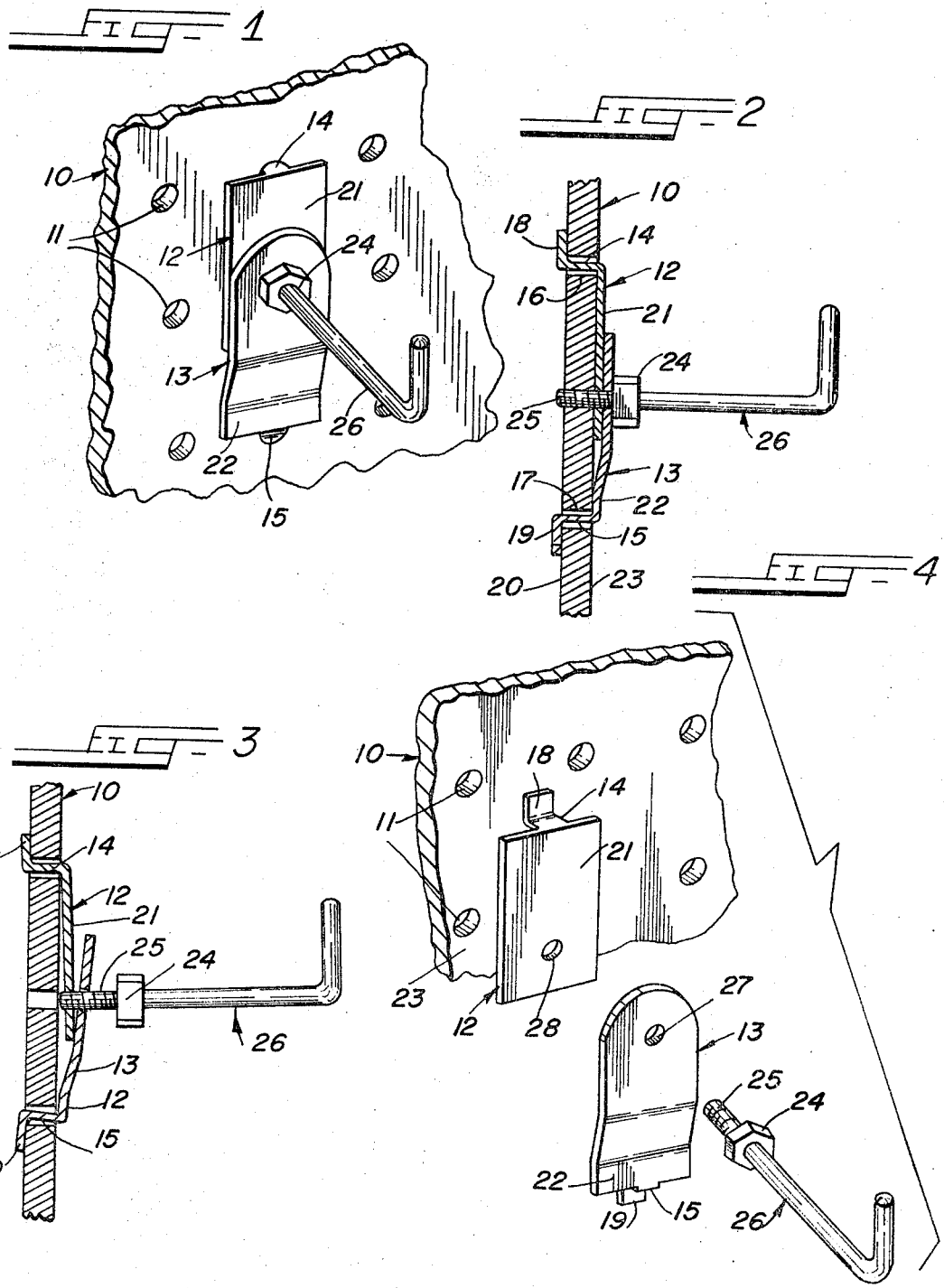
INVENTOR.
HENRY F. SCHENEMAN

SUPPORT BRACKET FOR ENGAGEMENT WITH PERFORATE PANELS

BACKGROUND OF THE INVENTION

"Peg board" panels have come into extremely wide use for practically everything from merchandise displays to supporting tools on the wall of a home workshop. Holes of standard spacing (usually one inch both ways) are provided in either plywood or a composition material (of standard thickness) marketed under the trademark "Masonite." A variety of suspension hooks are marketed for use in conjunction with these panels, the hooks having offset portions that are inserted while a hook is in a position approximately 90° from the ultimate position it will take when fully installed. The material of which the hooks are made is sufficiently smaller in diameter than the holes to permit the insertion of the offset portions in this position.

The problem with the conventional hook is the readiness it displays to being knocked out of place by an accidental blow or force on the underside of the unit. Such a force will tend to swing the hook up into the same position in which it was placed for insertion, thus making it vulnerable to disengagement from the panel. The present invention provides for a solid engagement of a suspension hook or bracket by members assembled into position from one side of the panel. Once there are fully installed, a blow from any direction will not dislodge the assembly.

SUMMARY OF THE INVENTION

A bracket assembly incorporating the present invention has separable members which are each provided with an offset tab engageable, respectively, with spaced holes in a standard peg board panel. These members, when engaged by a support arm, generate a solid clamping action on the opposite faces of the panel, and prevent accidental displacement of the support arm. The tabs are preferably engaged in two holes in a row separated by a hole which is entered by a portion of the support arm as it is engaged with the clamping members. These members are in overlapped relationship at this point. The amount of the offset of the tabs of the clamping members is slightly less than the thickness of the panel, so that the clamping members require force to be placed in a position parallel to the surface of the panel. This force is provided by a nut on the support arm bearing against the outer of the overlapped members. The arm passes freely through a hole in the outer member, and is in threaded engagement with the inner member. The pressure the nut brings the two members into parallel relationship, and thus generates the clamping action against the opposite faces of the panel at each of the tabs. The presence of the portion of the support arm in the central of the three holes prevents lateral displacement at this point.

DESCRIPTION OF THE DRAWING

The several features of the invention will be analyzed in detail through a discussion of the particular embodiment illustrated in the accompanying drawing. In the drawing:

FIG. 1 is a perspective view of a fully-installed support bracket assembly.

FIG. 2 is a sectional elevation through the assembly shown in FIG. 1.

FIG. 3 is a sectional elevation showing an initial stage in the installation of the assembly.

FIG. 4 is an exploded view showing the components of the assembly.

DESCRIPTION OF THE PREFERRED EMBODIMENT

The peg board panel 10 is provided with a plurality of regularly-spaced holes 11, the spacing in both horizontal and vertical directions preferably being the same. The clamping members 12 and 13 have offset portions 14 and 15, respectively, shown in engagement with the holes 16 and 17 in the panel 10 in FIG. 2. The portions 18 and 19 of the tabs engage the back surface 20 of the panel 10 in the fully installed position. The length of the offsets 14 and 15 is slightly less than the thickness of the panel 10, which causes the portions 21 and 22 of the members 12 and 13 to act in conjunction with the portions 18 and 19 of the tabs to deliver a clamping action between the back surface 20 and the front surface 23.

The force necessary to generate this clamping action is delivered by the combined effect of the nut 24 bearing against the outer surface of the member 13, in conjunction with the threaded engagement of the portion 25 of the support arm 26. In the assembly of the device, the clamping member 12 is initially engaged with the panel 10 in a position approximately 90° counterclockwise from that shown in FIG. 3. The offset portion 14, including the portion 18, are worked through the selected hole, followed by a clockwise rotation of the member 12 into the illustrated position. This same procedure is followed with the member 13, except that it is initially inserted in a position approximately 90° clockwise from that shown in FIG. 3, followed by a counterclockwise rotation into the illustrated position. After the members are thus partially installed, the threaded portion 25 of the arm 26 is worked through the clearance hole 27 and the outer member 13, and is engaged with the threaded hole 28 in the inner clamping member 12. The threaded engagement is run into the point where a convenient portion of the arm 26 engages the central hole of the group of three in which the unit is installed, as shown in FIG. 2. The nut 24 is then run down from the FIG. 3 position to the FIG. 2 position, and tightened to secure the assembly in place. When this has been accomplished, the entire assembly is solidly engaged with the panel 10, and will not be dislodged by accidental blows or forces. Preferably, the outer member 13 is joggled, or offset, by an amount equal to the thickness of the inner member 12, so that the pressure of the nut 24 can bring the two members into a solid overlapping bearing engagement.

I claim:

1. In combination with a panel having spaced perforations, a support for various objects comprising:

an inner member having an offset extension adapted to enter one of said perforations and engage the opposite side of said panel from the side of insertion, said inner member having a portion extending laterally with respect to said panel from said offset portion and provided with a threaded hole;

an outer member having an offset extension adapted to enter another of said perforations and engage said opposite panel side, said outer member having a portion extending laterally with respect to said panel from said offset portion, and provided with a hole alignable with said inner member hole when the offset portions of said inner and outer members are in engagement with selected spaced perforations;

a supporting member having a threaded end in engagement with said threaded hole and freely traversing said outer member hole; and nut means engaging said threaded end, and adapted to be tightened in bearing engagement against said outer member.

2. A combination as defined in claim 1, wherein said panel has at least three spaced perforations, and said threaded end is adapted to enter the central one of said perforations with said inner and outer members respectively engaging the others of said perforations.

3. A combination as defined in claim 1, wherein the laterally-extending portion of said inner member is normally disposed against the face of said panel, and the laterally extending portion of said outer member is joggled to provide an overlap with said inner member laterally-extending portion, and also a bearing surface engaging said panel face.

4. A combination as defined in claim 1, wherein said offset portions have a length selected to induce a clamping action between the opposite faces of said panel on tightening of said nut.